United States Patent
Chattopadhyaya

(10) Patent No.: US 11,689,542 B2
(45) Date of Patent: Jun. 27, 2023

(54) DETECTING, VERIFYING, AND PREVENTING UNAUTHORIZED USE OF A VOICE OVER INTERNET PROTOCOL SERVICE

(71) Applicant: International Business Machines Corporation, Armonk, NY (US)

(72) Inventor: Shayak Chattopadhyaya, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 240 days.

(21) Appl. No.: 17/305,441

(22) Filed: Jul. 7, 2021

(65) Prior Publication Data
US 2023/0011817 A1    Jan. 12, 2023

(51) Int. Cl.
| | |
|---|---|
| H04L 9/40 | (2022.01) |
| H04M 7/00 | (2006.01) |
| H04L 65/1069 | (2022.01) |
| H04L 65/1104 | (2022.01) |

(52) U.S. Cl.
CPC .......... *H04L 63/126* (2013.01); *H04L 63/083* (2013.01); *H04L 63/10* (2013.01); *H04L 65/1069* (2013.01); *H04L 65/1104* (2022.05); *H04M 7/006* (2013.01)

(58) Field of Classification Search
CPC ..... H04L 63/083; H04L 63/10; H04L 63/126; H04L 65/1069; H04L 65/1104; H04M 7/0078
See application file for complete search history.

(56) References Cited

U.S. PATENT DOCUMENTS

| | | | | |
|---|---|---|---|---|
| 8,085,937 | B1* | 12/2011 | Bradley, II | H04L 9/0825 |
| | | | | 713/168 |
| 8,270,588 | B2* | 9/2012 | Schwartz | H04M 3/436 |
| | | | | 704/244 |
| 8,681,783 | B2* | 3/2014 | Carney | H04M 3/436 |
| | | | | 370/328 |
| 9,774,726 | B1* | 9/2017 | Jenkins | H04M 3/2281 |
| 10,805,459 | B1 | 10/2020 | Botner | |
| 11,463,574 | B1* | 10/2022 | Smith-Rose | H04M 3/42059 |

(Continued)

OTHER PUBLICATIONS

Mell, et al., "The NIST Definition of Cloud Computing", National Institute of Standards and Technology, Special Publication 800-145, Sep. 2011, 7 pages.

*Primary Examiner* — Chau Le
(74) *Attorney, Agent, or Firm* — Edward P. Li

(57) ABSTRACT

A computer-implemented method, a computer program product, and a computer system for detecting, verifying and preventing unauthorized use of a Voice over Internet Protocol (VoIP) service. A computer rates a VoIP call based on a database including information of the caller number, in response to determining that no record of a caller number exists in a database including the information of unauthorized uses. The computer sets a predetermined time period for the VoIP call based on a rating of the VoIP call, adds the predetermined time period to a session initiation protocol (SIP) invite, and connects the VoIP call to a called party. In response to that the predetermined time period is reached, the computer interrupts the VoIP call and prompts the caller to conduct user verification. In response to that the caller is successfully verified, the computer reconnects the VoIP call to the called party.

20 Claims, 6 Drawing Sheets

(56) References Cited

U.S. PATENT DOCUMENTS

| | | |
|---|---|---|
| 2020/0077271 A1 | 3/2020 | Miranda |
| 2021/0084080 A1 | 3/2021 | Davis |
| 2021/0084147 A1* | 3/2021 | Kent .................... H04M 3/436 |
| 2023/0011817 A1* | 1/2023 | Chattopadhyaya ......................... H04L 65/1104 |
| 2023/0126032 A1* | 4/2023 | Swerdlow ......... H04M 3/53383 455/413 |

* cited by examiner

DETECTING, VERIFYING, AND PREVENTING UNAUTHORIZED USE OF A VOICE OVER INTERNET PROTOCOL SERVICE

BACKGROUND

The present invention relates generally to Voice over Internet Protocol (VoIP), and more particularly to detecting, verifying, and preventing unauthorized use of a VoIP service.

The Voice over Internet Protocol (VoIP) is a service of audio and video calls. By using the service, users are connected across the globe for audio and video calls. VoIP uses data or IP network instead of traditional telephone networks. The end devices can be softphones or VoIP phones. For any VoIP call, charges are calculated once the call completes and call detail records (CDRs) are generated. In a case of unauthorized use of a VoIP service, CDRs have erroneous data and unauthorized users either don't pay the call charges, pay less, or have the charges added to someone else's account. The unauthorized users do so by hacking into Internet Protocol private branch exchange (IP PBX), spoofing another user, masking the dialed number as a free call, e.g., calling an international destination and masking it as toll free. Based on the analysis of CDRs, if it is determined a call was unauthorized, then restrictions are placed to prevent similar unauthorized usage in future. The existing methods either prevent the unauthorized uses at the IP PBX or prevent further illegal usage after an unauthorized use is already committed. In a previous disclosure, a method uses an unauthorized use database which contains unauthorized phone numbers from/to where calls happen.

SUMMARY

In one aspect, a computer-implemented method for detecting, verifying, and preventing unauthorized use of a Voice over Internet Protocol (VoIP) service is provided. The computer-implemented method includes, in response to receiving a VoIP call from a caller, checking whether a record of a caller number of the VoIP call exists in a database including information of unauthorized uses. The computer-implemented method further includes, in response to determining that no record of the caller number exists in the database including the information of unauthorized uses, rating the VoIP call based on a database including information of the caller number. The computer-implemented method further includes setting a predetermined time period for the VoIP call, based on a rating of the VoIP call. The computer-implemented method further includes adding the predetermined time period to a session initiation protocol (SIP) invite. The computer-implemented method further includes connecting the VoIP call to a called party. The computer-implemented method further includes, in response to that the predetermined time period is reached, interrupting the VoIP call and prompting the caller to conduct user verification. The computer-implemented method further includes, in response to that the caller is successfully verified, reconnecting the VoIP call to the called party.

In another aspect, a computer system for detecting, verifying, and preventing unauthorized use of a Voice over Internet Protocol (VoIP) service is provided. The computer system comprises one or more processors, one or more computer readable tangible storage devices, and program instructions stored on at least one of the one or more computer readable tangible storage devices for execution by at least one of the one or more processors. The program instructions are executable to, in response to receiving a VoIP call from a caller, check whether a record of a caller number of the VoIP call exists in a database including information of unauthorized uses. The program instructions are further executable to rate the VoIP call based on a database including information of the caller number, in response to determining that no record of the caller number exists in the database including the information of unauthorized uses. The program instructions are further executable to set a predetermined time period for the VoIP call, based on a rating of the VoIP call. The program instructions are further executable to add the predetermined time period to a session initiation protocol (SIP) invite. The program instructions are further executable to connect the VoIP call to a called party. The program instructions are further executable to interrupt the VoIP call and prompt the caller to conduct user verification, in response to that the predetermined time period is reached. The program instructions are further executable to reconnect the VoIP call to the called party, in response to that the caller is successfully verified.

In yet another aspect, a computer-implemented method for detecting and preventing unauthorized use of a Voice over Internet Protocol (VoIP) service is provided. The computer-implemented method includes, in response to receiving a VoIP call from a caller, checking a caller number of active calls in a database about live calls. The computer-implemented method further includes determining whether another call is in progress from the caller number. The computer-implemented method further includes, in response to determining that another call is in progress from the caller number, determining whether the VoIP call is originated from an Internet Protocol private branch exchange (IP PBX). The computer-implemented method further includes, in response to determining that the VoIP call is originated from the IP PBX, determining whether the VoIP call is within an allowable number of calls from the IP PBX. The computer-implemented method further includes, in response to determining that the VoIP call is not originated from the IP PBX or in response to determining that the VoIP call is not within the allowable number of calls from the IP PBX, blocking the VoIP call.

DETAILED DESCRIPTION

In a current Voice over Internet Protocol (VoIP) service, once a VoIP call is initiated from a softphone or a VoIP phone application, the VoIP goes through an Internet Protocol private branch exchange (IP PBX) or connect directly to a carrier network. After traversing through intermediate network elements, a session initiation protocol invite (SIP INVITE) of the VoIP call reaches a session initiation protocol (SIP) server. The SIP server acts as a back-to-back user agent (B2BUA) and connects the VoIP call to a terminating party (or called party). Once the VoIP call completes, the SIP server creates a call detail record (CDR) which is used for billing and verification. In case an unauthorized use is identified, the caller is blocked from making any further calls. However, by the time the CDR is analyzed and an unauthorized use is identified, time has passed; as a result, carriers and unsuspecting subscribers (spoofed) may have lost large amount of money.

Embodiments of the present invention propose a system that screen any call originating from a carrier's network by using a rating server and a live calls database. If the rating server determines that a call is an unauthorized use, the system blocks the call. If the rating server determines that a call is an authorized use, a rating to the VoIP call will be assigned by the rating server and the rating determines how many minutes the caller can talk uninterruptedly. The rating server rates the call based on information about user's privilege, user's historical usage, user's spending limit, and other policies; the information is stored on a customer & unauthorized use database in the system. Based on the rating, the call is given a time limit and connected to a called party. If the call exceeds the time limit, the system determines that the call is a potential case of an unauthorized use. The call is put on hold (or interrupted) and the caller is redirected to a user verification server to self-verify. If the verification is successful, the caller is again connected back to the called party. If the verification fails, the system terminates the call, and caller's number is placed in an unauthorized use database.

Figure 1:
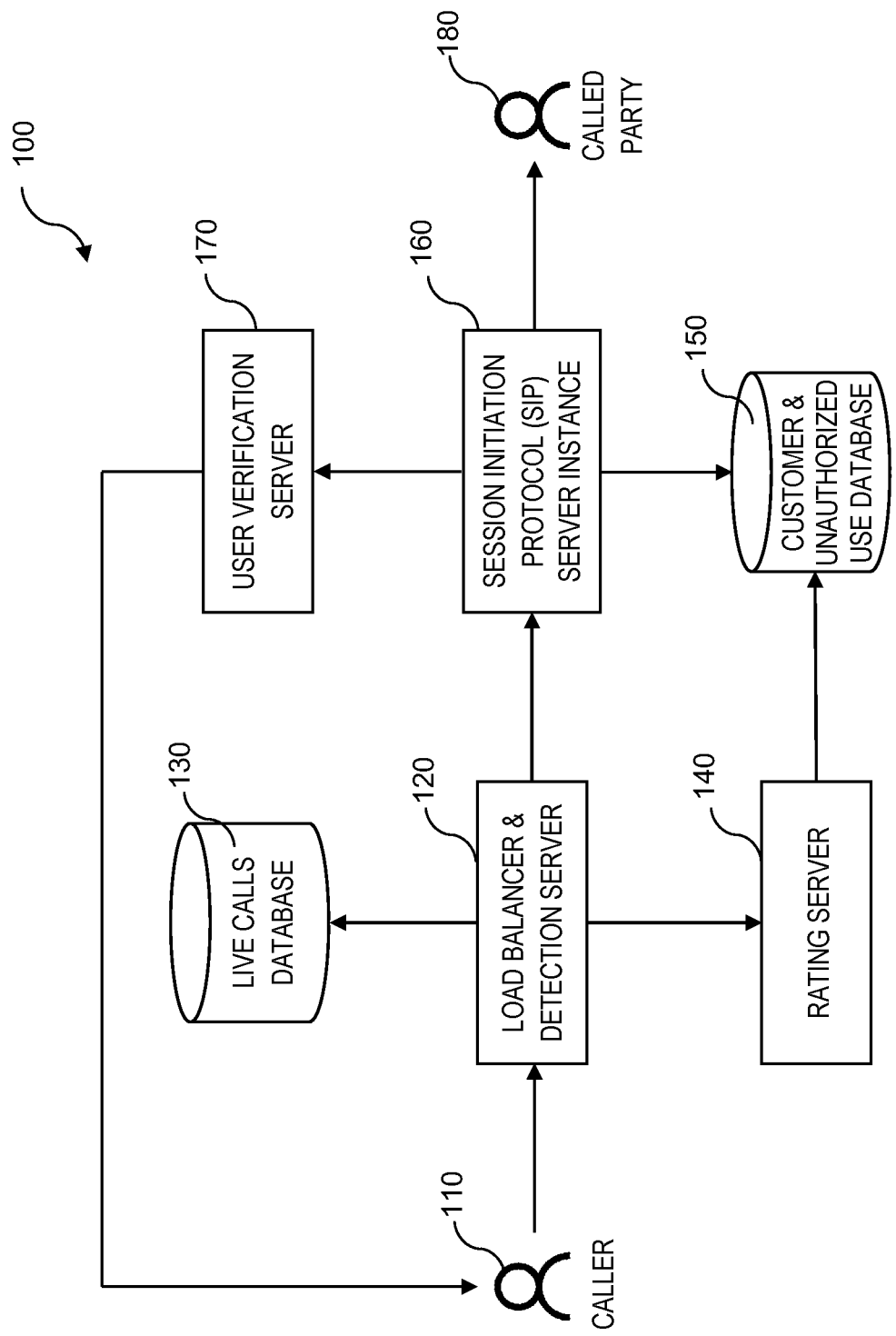
FIG. 1 is a systematic diagram illustrating a system for detecting, verifying, and preventing unauthorized use of a Voice over Internet Protocol (VoIP) service, in accordance with one embodiment of the present invention.

FIG. 1 is a systematic diagram illustrating system 100 for detecting, verifying, and preventing unauthorized use of a VoIP service, in accordance with one embodiment of the present invention. System 100 may be implemented on one or more computing devices or servers. A computing device or server is described in more detail in later paragraphs with reference to FIG. 3. System 100 may be implemented in a cloud computing environment. The cloud computing environment is described in more detail in later paragraphs with reference to FIG. 4 and FIG. 5.

System 100 includes load balancer & detection server 120, live calls database 130, rating server 140, customer & unauthorized use database 150, session initiation protocol (SIP) server instance 160, and user verification server 170.

Load balancer & detection server 120, which acts both as a load balancer and a server for unauthorized use detection, keeps track of all live calls happening at any point of time. When a VoIP call is initiated by caller 110, a SIP invite of the VoIP call reaches load balancer & detection server 120. When the new VoIP call comes in, load balancer & detection server 120 checks the number of active calls from caller 100 in live calls database 130. Load balancer & detection server 120 checks whether caller 110 is already in another call (i.e., from the same number, another call is already in progress). If caller 110 is already in another call, then load balancer & detection server 120 checks whether the VoIP call is originated from an IP PBX. If the VoIP call is originated from the IP PBX, load balancer & detection server 120 checks whether the number of active calls for the IP PBX falls within an allowed range. If the number of active calls for the IP PBX is beyond the allowed range (this is a case where an unauthorized user spoofs the number), load balancer & detection server 120 blocks the VoIP call. It is noted that individual active calls can be serviced by different SIP servers and different SIP servers don't have knowledge of other calls in other servers. Load balancer & detection server 120 has information about all active calls being serviced by different SIP servers.

If load balancer & detection server 120 determines that caller 110 has no active calls or the number of active calls for the IP PBX is within an allowed range, load balancer & detection server 120 sends information of the VoIP call to rating server 140. Rating server 140 checks whether a record of the caller's number of the VoIP call exists in customer & unauthorized use database 150. If rating server 140 determines that the VoIP call is an unauthorized use (or the record of the caller's number exists in customer & unauthorized use database 150), load balancer & detection server 120 blocks the VoIP call. If rating server 140 determines that the VoIP call is not an unauthorized use (or no record of the caller's number exists in customer & unauthorized use database 150), rating server 140 assigns the VoIP call a rating. Assigning the rating is based on several factors, including an account type (for example, the VoIP call is domestic and the caller has unlimited free domestic calls), historical usage (for example, the caller has never made an international call and now is making an international call), a spending limit, and any other policies. The rating signifies how many minutes the caller can talk uninterrupted.

Load balancer & detection server 120 sets a predetermined time period for the VoIP call, according to the rating. Load balancer & detection server 120 adds the rating as a custom header in the SIP invite and forward the SIP invite to SIP server instance 160 based on the load. SIP server instance 160 connects the VoIP call of caller 110 to called party 180. When caller 110 and called party 180 are connected, SIP server instance 160 starts a timer to count the time. If the connection between caller 110 and called party 180 exceeds the time limit set in the custom header, SIP server instance 160 puts the connection on hold (i.e., interrupts the VoIP call) and redirects caller 110 to user verification server 170.

To verify caller 110, user verification server 170 prompts caller 110 to identify oneself. The verification may, for example, be conducted through security questions or a personal identification number (PIN). If caller 100 successfully verifies at user verification server 170, SIP server instance 160 reconnects caller 110 back to called party 180; thus, the VoIP call continues. If caller 100 fails to verify at user verification server 170, SIP server instance 160 disconnects caller 110 and called party 180, and the VoIP call is terminated. In a case where caller 110 fails to verify at user verification server 170, SIP server instance 160 stores the caller's number of caller 110 in customer & unauthorized use database 150; therefore, any future VoIP call from caller 110 will be blocked. Caller 110 may call the customer care of the carrier to lift the restriction through a verification process.

Figure 2A:
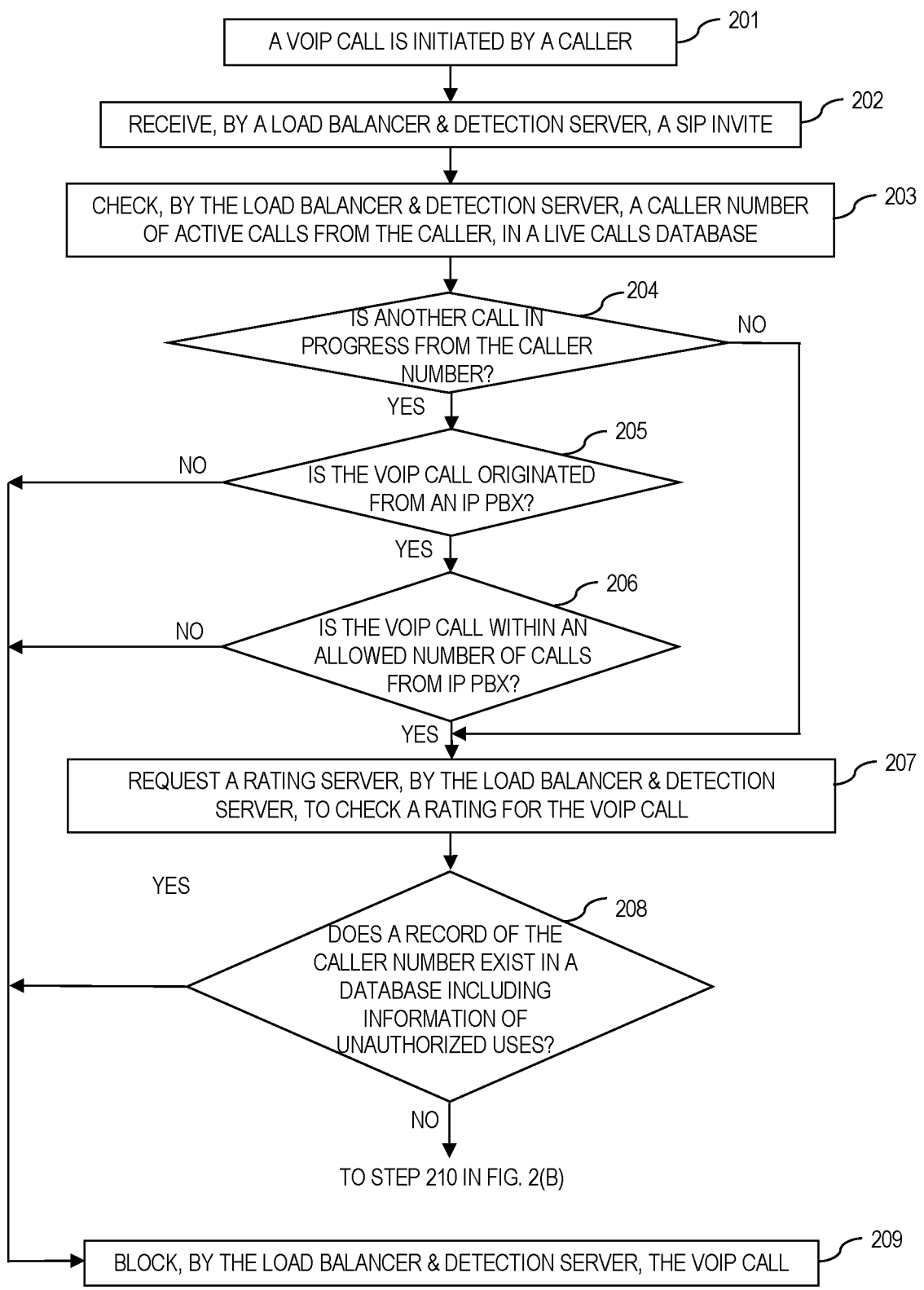
FIG. 2(A) and FIG. 2(B) present a flowchart showing operational steps of detecting, verifying, and preventing unauthorized use of a Voice over Internet Protocol (VoIP) service, in accordance with one embodiment of the present invention.
Figure 2B:
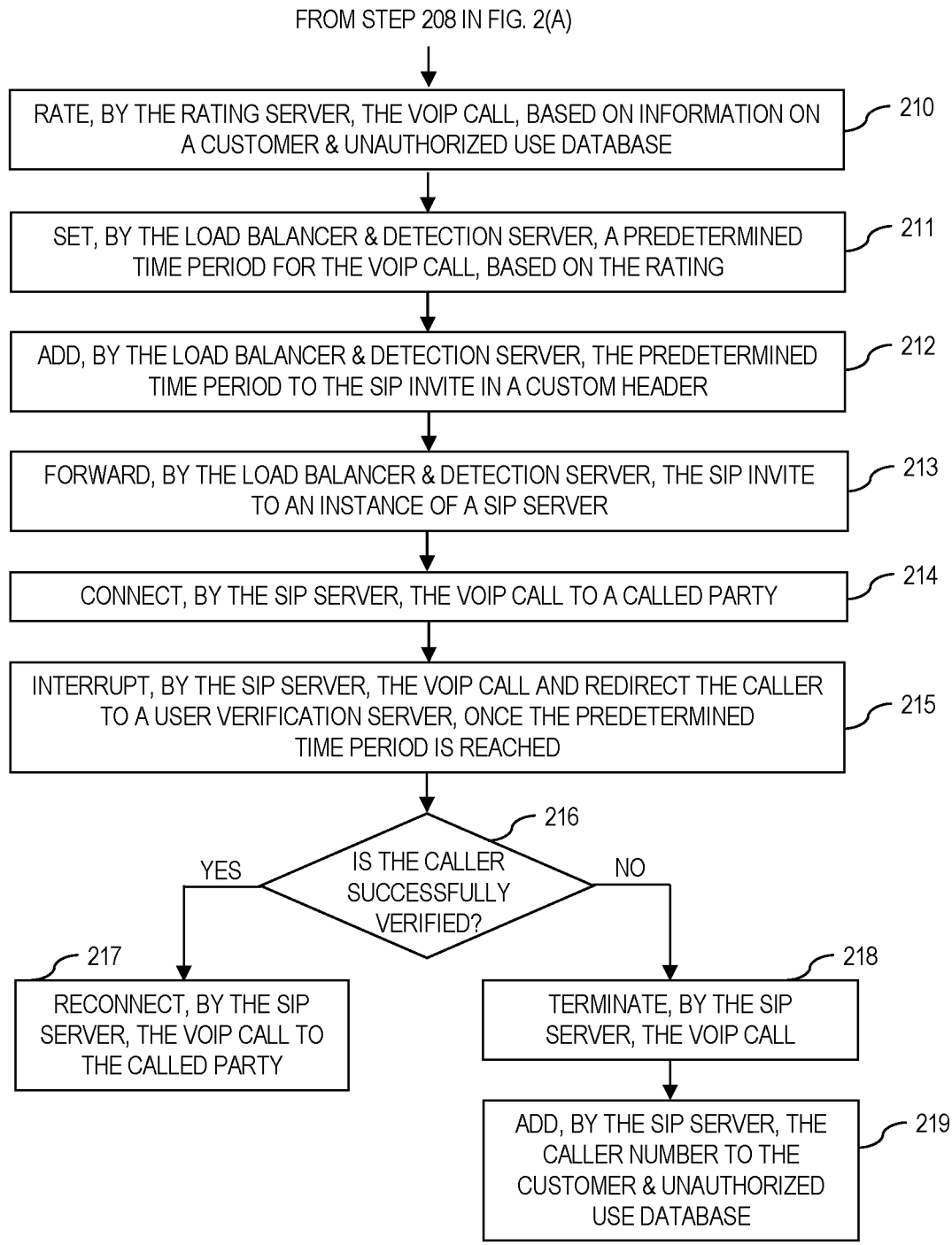

FIG. 2(A) and FIG. 2(B) present a flowchart showing operational steps of detecting, verifying and preventing unauthorized use of a VoIP service, in accordance with one embodiment of the present invention. The operational steps are implemented by a system (such as system 100 shown in FIG. 1) for detecting, verifying, and preventing unauthorized use of a VoIP service. The system for detecting, verifying, and preventing unauthorized use may be implemented on one or more computing devices or servers.

At step 201, a VoIP call is initiated by a caller. The VoIP call is initiated from a softphone or a VoIP phone application. At step 202, the system, e.g., a load balancer and detection server in the system, receives a SIP invite. After traversing through intermediate network elements in a carrier's network, the SIP invite reaches load balancer and detection in the system.

At step 203, the system, e.g., the load balancer and detection server in the system, checks a caller number of active calls from the caller. Caller's active calls and the used caller number are stored in a database, e.g., a live calls database in the system. Through checking the caller number of the active calls stored in the live calls database, at step 204, the system (e.g., the load balancer and detection server) determines whether another call is already in progress from the same caller number. If the VoIP call is behind an IP PBX, the number of the VoIP call is not shown; instead, only the number of the IP PBX is shown; thus, the system may identify that multiple calls are from the same number (i.e., the number of the IP PBX). Therefore, the system checks whether the VoIP call is behind the IP PBX, if another call is already in progress from the same caller number. In response to determining that the caller is already in another call (YES branch of decision block 204), the system (e.g., the load balancer and detection server) at step 205 determines whether the VoIP call is originated from an IP PBX. In response to determining that the caller is not already in another call (NO branch of decision block 204), the system jumps to step 207. (Step 207 will be discussed in a later paragraph.)

In response to determining that the VoIP call is not originated from the IP PBX (NO branch of decision block 205), the system (e.g., the load balancer and detection server) at step 209 blocks the VoIP call. In response to determining that the VoIP call is originated from the IP PBX (YES branch of decision block 205), the system (e.g., the load balancer and detection server) at step 206 determines whether the VoIP call is within an allowable number of calls from the IP PBX.

In response to determining that the VoIP call is not within the allowable number of calls from the IP PBX (NO branch of decision block 206), the system (e.g., the load balancer and detection server) at step 209 blocks the VoIP call.

In response to determining that the VoIP call is within the allowable number of calls from the IP PBX (YES branch of decision block 206), or in response to determining that the caller is not already in another call (NO branch of decision block 204, as mentioned in a previous paragraph), at step 207, the load balancer and detection server in the system requests a rating server in the system to check a rating of the VoIP call.

At step 208, the system, e.g., the rating server in the system, determines whether a record of the caller number exists in a database including information of unauthorized use. By checking whether the record of the caller's number of the VoIP call exists in the database (e.g., a customer & unauthorized use database in the system), the system determines whether the VoIP call is unauthorized. In response to determining that the record of the caller number exists in the database including the information of unauthorized uses (YES branch of decision block 208), the system determines that the VoIP call is unauthorized and thus the system (e.g., the load balancer and detection server) at step 209 blocks the VoIP call.

In response to determining that no record of the caller number exists in the database including the information of unauthorized uses (NO branch of decision block 208), the system determines that the VoIP call is authorized. At step 210, the system (e.g., the rating server in the system) rates the VoIP call, based on information on a database (e.g., the customer & unauthorized use database) that includes information of the caller number. The rating server assigns a rating to the VoIP call and the rating signifies how many minutes the caller can talk uninterruptedly. On the customer & unauthorized use database, the information of the caller number includes an account type (for example, the VoIP call is domestic and the caller has unlimited free domestic calls), historical usage (for example, the caller has never made an international call and now is making an international call), a spending limit, and other policies on the caller number.

At step 211, the system (e.g., the load balancer and detection server in the system) sets a predetermined time period for the VoIP call, based on the rating. At step 212, the system (e.g., the load balancer and detection server in the system) adds the predetermined time period to the SIP invite in a custom header. At step 213, the load balancer and detection server forwards the SIP invite to a SIP server in the system.

At step 214, the system (e.g., the SIP server in the system) connects the VoIP to a called party. When the VoIP is connected to the called party, the system (e.g., the SIP server in the system) starts a timer according to the predetermined time period for the VoIP call. At step 215, once the predetermined time period is reached, the SIP server in the system interrupts the VoIP call and redirects the caller to a user verification server in the system. At the user verification server, the caller self-verifies. The user verification server prompts the caller to conduct user verification. For example, the user verification many be conducted by answering security questions or inputting a personal identification number (PIN).

At step 216, the system (e.g., the user verification server in the system) determines whether the caller is successfully verified. In response to determining that the caller is successfully verified (YES branch of decision block 216), at step 217, the system (e.g., SIP server in the system) reconnects the VoIP call to the called party. In response to determining that the caller is not successfully verified (NO branch of decision block 216), at step 218, the system (e.g., SIP server in the system) terminates the VoIP call. At step 219, the system (e.g., SIP server in the system) adds the caller number to a database (e.g. the customer & unauthorized use database). The caller number is stored in the customer & unauthorized use database as an unauthorized use, and any future VoIP call from the caller number will be blocked.

Figure 3:
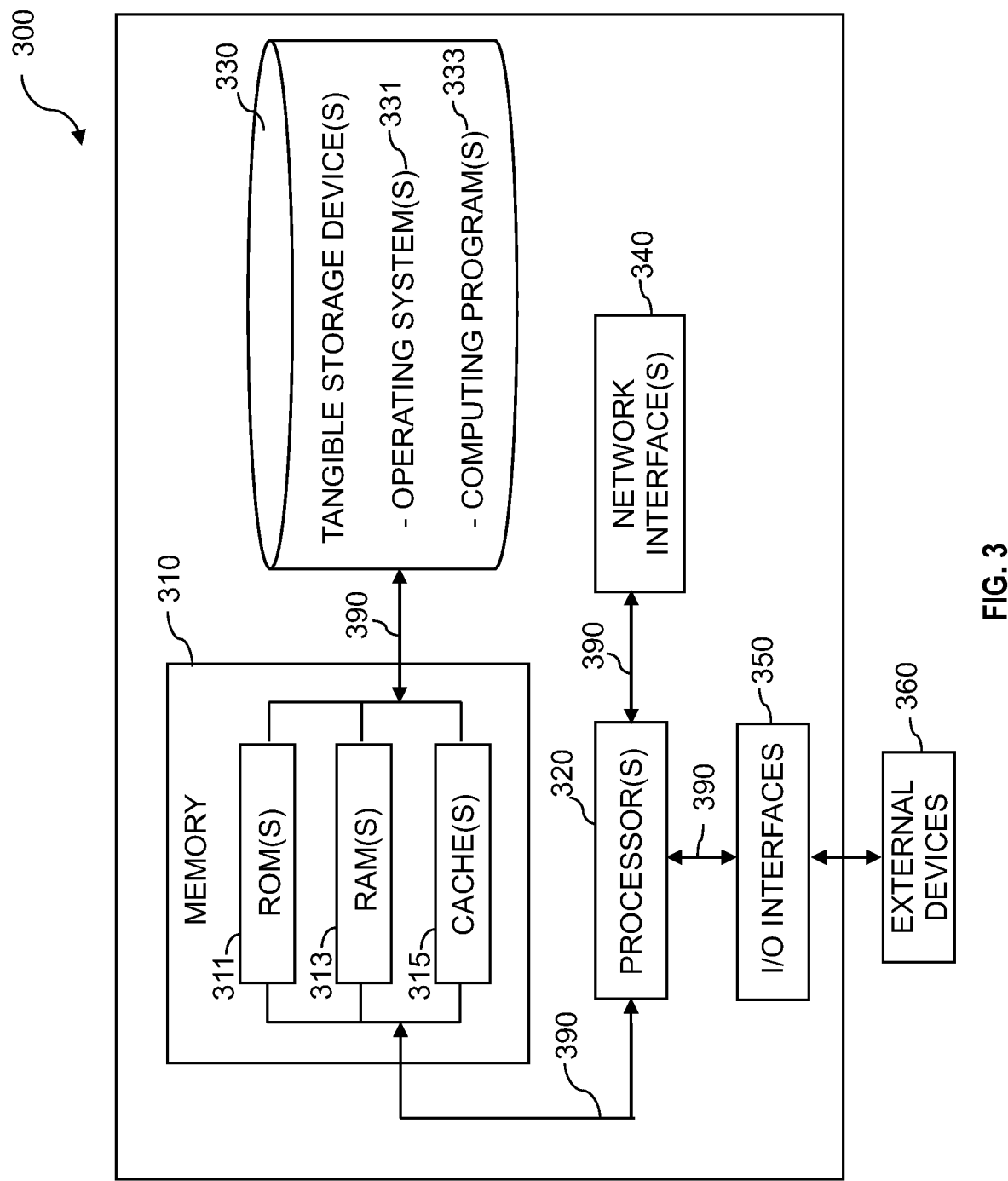
FIG. 3 is a diagram illustrating components of a computing device, in accordance with one embodiment of the present invention.

FIG. 3 is a diagram illustrating components of computing device or server 300, in accordance with one embodiment of the present invention. It should be appreciated that FIG. 3 provides only an illustration of one implementation and does not imply any limitations with regard to the environment in which different embodiments may be implemented.

Referring to FIG. 3, computing device or server 300 includes processor(s) 320, memory 310, and tangible storage device(s) 330. In FIG. 3, communications among the above-mentioned components of computing device or server 300 are denoted by numeral 390. Memory 310 includes ROM(s) (Read Only Memory) 311, RAM(s) (Random Access Memory) 313, and cache(s) 315. One or more operating systems 331 and one or more computer programs 333 reside on one or more computer readable tangible storage device(s) 330.

Computing device or server 300 further includes I/O interface(s) 350. I/O interface(s) 350 allows for input and output of data with external device(s) 360 that may be connected to computing device or server 300. Computing device or server 300 further includes network interface(s) 340 for communications between computing device or server 300 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 3, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 4:
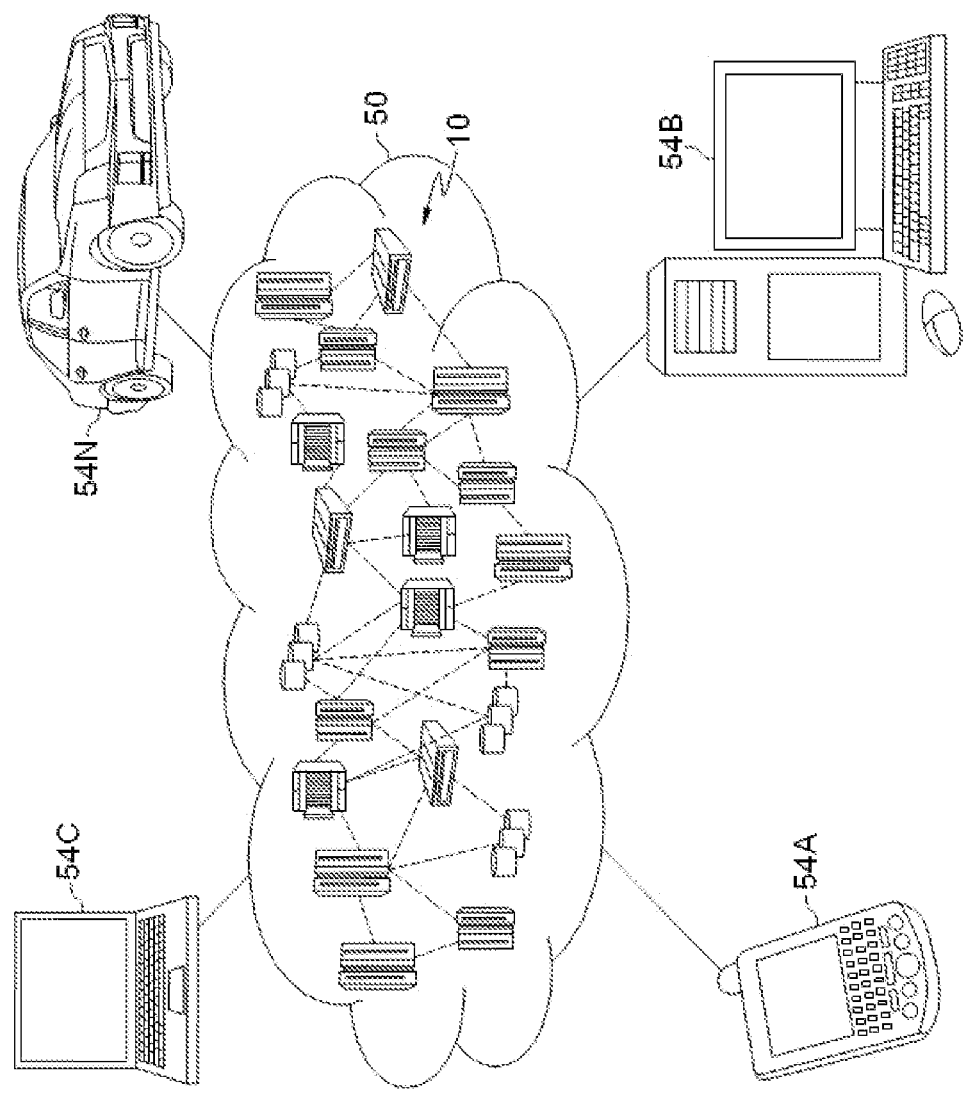
FIG. 4 depicts a cloud computing environment, in accordance with one embodiment of the present invention.
Figure 5:
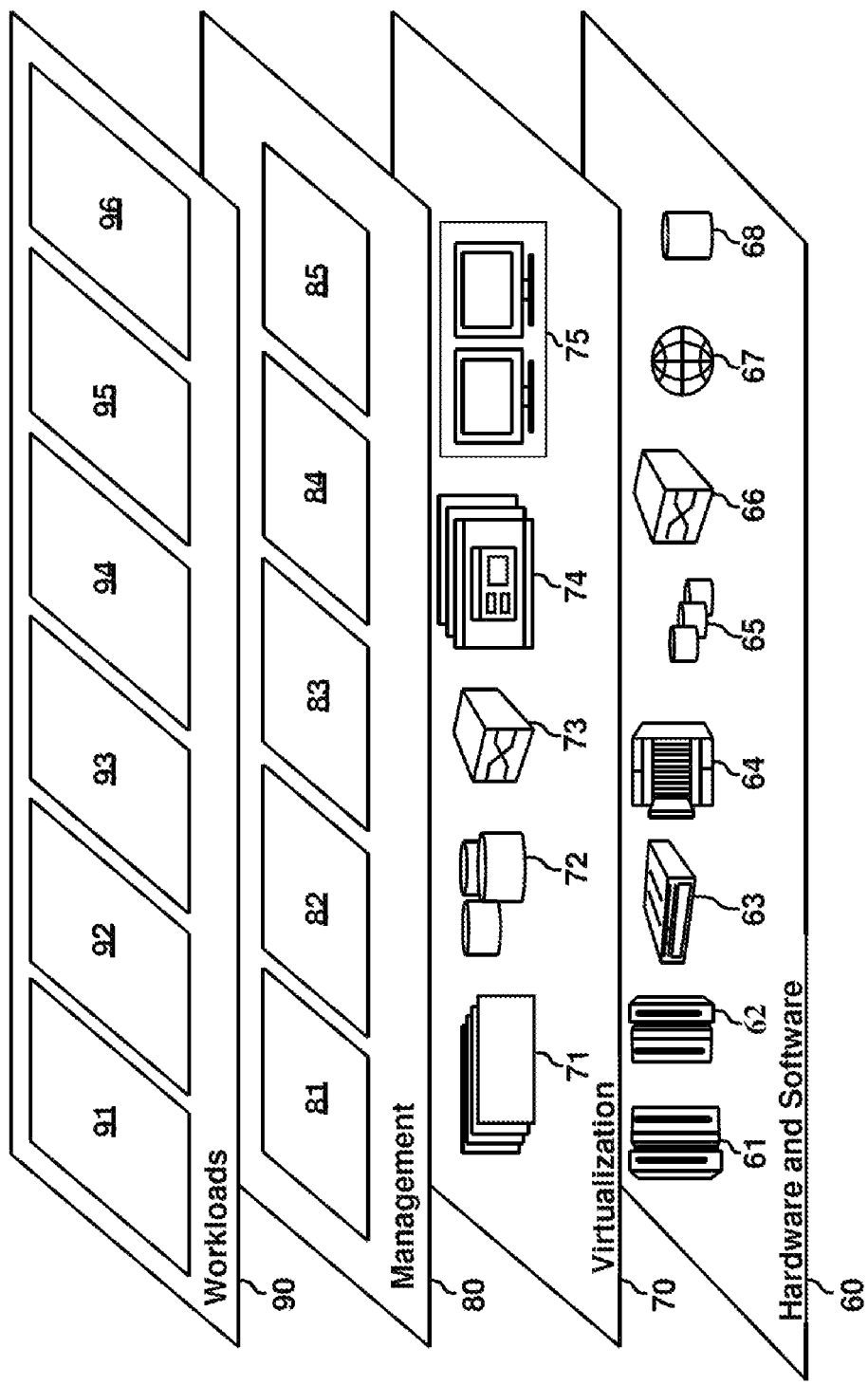
FIG. 5 depicts abstraction model layers in a cloud computing environment, in accordance with one embodiment of the present invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in the present invention is the functionality of detecting, verifying, and preventing unauthorized use of a Voice over Internet Protocol (VoIP) service.

What is claimed is:

1. A computer-implemented method for detecting, verifying, and preventing unauthorized use of a Voice over Internet Protocol (VoIP) service, the method comprising:
    in response to receiving a VoIP call from a caller, checking whether a record of a caller number of the VoIP call exists in a database including information of unauthorized uses;
    in response to determining that no record of the caller number exists in the database including the information of unauthorized uses, rating the VoIP call, based on a database including information of the caller number;
    setting a predetermined time period for the VoIP call, based on a rating of the VoIP call;
    adding the predetermined time period to a session initiation protocol (SIP) invite;
    connecting the VoIP call to a called party;
    in response to that the predetermined time period is reached, interrupting the VoIP call and prompting the caller to conduct user verification; and
    in response to that the caller is successfully verified, reconnecting the VoIP call to the called party.

2. The computer-implemented method of claim 1, further comprising:
    in response to that the caller is not successfully verified, terminating the VoIP call; and
    adding the caller number in the database including the information of unauthorized uses.

3. The computer-implemented method of claim 1, further comprising:
    in response to determining that the record of the caller number exists in the database including the information of unauthorized uses, blocking the VoIP call.

4. The computer-implemented method of claim 1, wherein the user verification includes at least one of answering security questions and inputting a personal identification number (PIN).

5. The computer-implemented method of claim 1, wherein the information of the caller number includes at least one of an account type, historical usage, a spending limit, and policies on the caller number.

6. The computer-implemented method of claim 1, further comprising:
    checking the caller number of active calls in a database about live calls;
    determining whether another call is in progress from the caller number;
    in response to determining that another call is in progress from the caller number, determining whether the VoIP call is originated from an Internet Protocol private branch exchange (IP PBX);
    in response to determining that the VoIP call is originated from the IP PBX, determining whether the VoIP call is within an allowable number of calls from the IP PBX; and
    in response to determining that the VoIP call is within the allowable number of calls from the IP PBX or in response to determining that another call is not in progress from the caller number, requesting a rating server to check the rating for the VoIP call.

7. The computer-implemented method of claim 6, further comprising:
    in response to determining that the VoIP call is not originated from the IP PBX or in response to determining that the VoIP call is not within the allowable number of calls from the IP PBX, blocking the VoIP call.

8. A computer system for detecting, verifying, and preventing unauthorized use of a Voice over Internet Protocol (VoIP) service, the computer system comprising one or more processors, one or more computer readable tangible storage devices, and program instructions stored on at least one of the one or more computer readable tangible storage devices for execution by at least one of the one or more processors, the program instructions executable to:
    in response to receiving a VoIP call from a caller, check whether a record of a caller number of the VoIP call exists in a database including information of unauthorized uses;
    in response to determining that no record of the caller number exists in the database including the information of unauthorized uses, rate the VoIP call, based on a database including information of the caller number;
    set a predetermined time period for the VoIP call, based on a rating of the VoIP call;
    add the predetermined time period to a session initiation protocol (SIP) invite;
    connect the VoIP call to a called party;
    in response to that the predetermined time period is reached, interrupt the VoIP call and prompt the caller to conduct user verification; and
    in response to that the caller is successfully verified, reconnect the VoIP call to the called party.

9. The computer system of claim 8, further comprising the program instructions executable to:
  in response to that the caller is not successfully verified, terminate the VoIP call; and
  add the caller number in the database including the information of unauthorized uses.

10. The computer system of claim 8, further comprising the program instructions executable to:
  in response to determining that the record of the caller number of the VoIP call exists in the database including the information of unauthorized uses, blocking the VoIP call.

11. The computer system of claim 8, wherein the user verification includes at least one of answering security questions and inputting a personal identification number (PIN).

12. The computer system of claim 8, wherein the information of the caller number includes at least one of an account type, historical usage, a spending limit, and policies on the caller number.

13. The computer system of claim 8, further comprising program instructions executable to:
  check the caller number of active calls in a database about live calls;
  determine whether another call is in progress from the caller number;
  in response to determining that another call is in progress from the caller number, determine whether the VoIP call is originated from an Internet Protocol private branch exchange (IP PBX);
  in response to determining that the VoIP call is originated from the IP PBX, determine whether the VoIP call is within an allowable number of calls from the IP PBX; and
  in response to determining that the VoIP call is within the allowable number of calls from the IP PBX or in response to determining that another call is not in progress from the caller number, request a rating server to check the rating for the VoIP call.

14. The computer system of claim 13, further comprising the program instructions executable to:
  in response to determining that the VoIP call is not originated from the IP PBX or in response to determining that the VoIP call is not within the allowable number of calls from the IP PBX, block the VoIP call.

15. A computer-implemented method for detecting and preventing unauthorized use of a Voice over Internet Protocol (VoIP) service, the method comprising:
  in response to receiving a VoIP call from a caller, checking a caller number of active calls in a database about live calls;
  determining whether another call is in progress from the caller number;
  in response to determining that another call is in progress from the caller number, determining whether the VoIP call is originated from an Internet Protocol private branch exchange (IP PBX);
  in response to determining that the VoIP call is originated from the IP PBX, determining whether the VoIP call is within an allowable number of calls from the IP PBX; and
  in response to determining that the VoIP call is not originated from the IP PBX or in response to determining that the VoIP call is not within the allowable number of calls from the IP PBX, blocking the VoIP call.

16. The computer-implemented method of claim 15, further comprising:
  in response to determining that the VoIP call is within the allowable number of calls from the IP PBX or in response to determining that is not in progress from the caller number, checking whether a record of a caller number of the VoIP call exists in a database including information of unauthorized uses;
  in response to determining that no record of the caller number exists in the database including the information of unauthorized uses, rating the VoIP call, based on a database including information of the caller number;
  setting a predetermined time period for the VoIP call, based on a rating of the VoIP call;
  adding the predetermined time period to a session initiation protocol (SIP) invite;
  connecting the VoIP call to a called party;
  in response to that the predetermined time period is reached, interrupting the VoIP call and prompting the caller to conduct user verification; and
  in response to that the caller is successfully verified, reconnecting the VoIP call to the called party.

17. The computer-implemented method of claim 16, further comprising:
  in response to that the caller is not successfully verified, terminating the VoIP call; and
  adding the caller number in the database including the information of unauthorized uses.

18. The computer-implemented method of claim 16, further comprising:
  in response to determining that the record of the caller number exists in the database including the information of unauthorized uses, blocking the VoIP call.

19. The computer-implemented method of claim 16, wherein the user verification includes at least one of answering security questions and inputting a personal identification number (PIN).

20. The computer-implemented method of claim 16, wherein the information of the caller number includes at least one of an account type, historical usage, a spending limit, and policies on the caller number.

* * * * *